(12) United States Patent
Sivaraman et al.

(10) Patent No.: US 10,364,761 B2
(45) Date of Patent: Jul. 30, 2019

(54) TURBOCHARGER

(71) Applicant: MAHLE FILTER SYSTEMS JAPAN CORPORATION, Tokyo (JP)

(72) Inventors: Vijayakumar Sivaraman, Tokyo (JP); Masamoto Hayashi, Oita (JP)

(73) Assignee: MAHLE FILTER SYSTEMS JAPAN CORPORATION, Tokyo (JP)

( * ) Notice: Subject to any disclaimer, the term of this patent is extended or adjusted under 35 U.S.C. 154(b) by 10 days.

(21) Appl. No.: 15/534,220

(22) PCT Filed: Dec. 3, 2015

(86) PCT No.: PCT/JP2015/083986
§ 371 (c)(1),
(2) Date: Jun. 8, 2017

(87) PCT Pub. No.: WO2016/098604
PCT Pub. Date: Jun. 23, 2016

(65) Prior Publication Data
US 2017/0363024 A1 Dec. 21, 2017

(30) Foreign Application Priority Data
Dec. 19, 2014 (JP) .................................. 2014-257541

(51) Int. Cl.
*F02D 41/00* (2006.01)
*F02B 29/04* (2006.01)
(Continued)

(52) U.S. Cl.
CPC ...... *F02D 41/0007* (2013.01); *F02B 29/0425* (2013.01); *F02B 33/34* (2013.01);
(Continued)

(58) Field of Classification Search
CPC ............. F02D 41/0007; F02B 29/0425; F02B 33/013; F02B 33/40; F02B 37/013;
(Continued)

(56) References Cited

U.S. PATENT DOCUMENTS 5,904,471 A * 5/1999 Woollenweber ........ F02B 37/16
417/307
6,102,672 A * 8/2000 Woollenweber .... F04D 29/5806
417/366
(Continued)

FOREIGN PATENT DOCUMENTS

DE 10156704 A1 * 5/2003 ............. F02B 37/14
EP 1749991 A2 * 2/2007 ............. F02B 37/04
(Continued)

OTHER PUBLICATIONS

European Search Report, dated Jun. 11, 2018, 5 pages.
Japanese Office Action, dated Oct. 31, 2018, 6 pages.

*Primary Examiner* — Jason D Shanske
*Assistant Examiner* — Jessica L Kebea
(74) *Attorney, Agent, or Firm* — Foley & Lardner LLP

(57) ABSTRACT

A turbocharger (1) includes a turbine wheel (3) driven by exhaust gas, first and second compressor wheels (4, 5) coaxially coupled to the turbine wheel (3) via a shaft member (6), a compressor housing (8) accommodating the first and second compressor wheels (4, 5) and having defined therein a communication passage (17) through which air compressed by the first compressor wheel (4) flows to the second compressor wheel (5), and an electric motor (11) arranged in the communication passage (17) and using the shaft member (6) as a rotation shaft thereof.

6 Claims, 3 Drawing Sheets

(51) Int. Cl.
| | | |
|---|---|---|
| *F02B 33/34* | (2006.01) | |
| *F02B 33/40* | (2006.01) | |
| *F02B 37/013* | (2006.01) | |
| *F02B 37/10* | (2006.01) | |
| *F02B 37/12* | (2006.01) | |
| *F02B 39/00* | (2006.01) | |
| *F02B 39/10* | (2006.01) | |
| *F02B 47/10* | (2006.01) | |
| *F02M 26/05* | (2016.01) | |
| *H02K 5/18* | (2006.01) | |
| *H02K 5/20* | (2006.01) | |
| *H02K 9/06* | (2006.01) | |
| *H02K 9/14* | (2006.01) | |
| *H02K 7/14* | (2006.01) | |

(52) U.S. Cl.
CPC ............ *F02B 33/40* (2013.01); *F02B 37/013* (2013.01); *F02B 37/10* (2013.01); *F02B 37/12* (2013.01); *F02B 39/005* (2013.01); *F02B 39/10* (2013.01); *H02K 5/18* (2013.01); *H02K 5/20* (2013.01); *H02K 9/06* (2013.01); *H02K 9/14* (2013.01); *F02B 47/10* (2013.01); *F02B 2037/122* (2013.01); *F02M 26/05* (2016.02); *H02K 7/14* (2013.01); *Y02T 10/144* (2013.01)

(58) Field of Classification Search
CPC ........ F02B 37/10; F02B 37/12; F02B 39/005; F02B 39/10; F02B 2037/122
USPC .......................................................... 290/52
See application file for complete search history.

(56) References Cited

U.S. PATENT DOCUMENTS

| | | | | |
|---|---|---|---|---|
| 6,129,524 A * | 10/2000 | Woollenweber | ........ | F04D 17/12 417/366 |
| 6,305,169 B1 * | 10/2001 | Mallof | .................. | F01D 15/10 60/608 |
| 6,390,789 B1 * | 5/2002 | Grob | ...................... | F04D 17/12 417/251 |
| 7,530,230 B2 * | 5/2009 | Shibui | ..................... | F02B 37/04 290/52 |
| 8,181,462 B2 * | 5/2012 | Arnold | .................... | F01D 5/048 60/612 |
| 8,237,316 B2 | 8/2012 | Bischof et al. | | |
| 8,801,398 B2 * | 8/2014 | Korenblik | ............. | F04D 17/122 310/90 |
| 9,624,934 B2 * | 4/2017 | Parker | ...................... | F04D 19/00 |
| 2003/0223892 A1 * | 12/2003 | Woollenweber | ........ | F01D 15/10 417/407 |
| 2004/0200215 A1 | 10/2004 | Woollenweber et al. | | |
| 2004/0216445 A1 * | 11/2004 | Jones | ...................... | F01D 5/022 60/226.1 |
| 2008/0087018 A1 * | 4/2008 | Woollenweber | ........ | F01D 25/16 60/605.3 |
| 2008/0107547 A1 * | 5/2008 | Kaminski | ............... | F04D 25/06 417/366 |
| 2010/0175377 A1 | 7/2010 | Hippen et al. | | |
| 2010/0247343 A1 * | 9/2010 | Shimizu | .................. | F01D 25/12 417/410.1 |
| 2012/0017617 A1 | 1/2012 | Beers et al. | | |
| 2013/0094950 A1 * | 4/2013 | Bode | ....................... | F04D 25/06 415/191 |

FOREIGN PATENT DOCUMENTS

| | | | |
|---|---|---|---|
| EP | 2 072 824 A2 | 6/2009 | |
| FR | 2922971 A1 * | 5/2009 | ............. F04D 17/10 |
| JP | 2000-130176 A | 5/2000 | |
| JP | 2006-333660 A | 12/2006 | |
| JP | 2011-509374 A | 3/2011 | |
| JP | 2012-026436 A | 2/2012 | |
| WO | WO 2009/087273 A2 | 7/2009 | |
| WO | WO-2010/081123 A1 | 7/2010 | |
| WO | WO-2014080501 A1 * | 5/2014 | ............. F02B 39/00 |

\* cited by examiner

TURBOCHARGER

FIELD OF THE INVENTION

The present invention relates to a turbocharger for an internal combustion engine.

BACKGROUND ART

There is conventionally known a turbocharger that includes: a turbine wheel attached to one end of a shaft member and rotated by exhaust gas energy; and a compressor wheel coaxially attached to the other end of the shaft member and adapted to compress air and supply the compressed air to a combustion chamber of an internal combustion engine.

Patent Document 1 discloses a turbocharger of the above-mentioned type, which further includes an electric motor disposed on the shaft member between the turbine wheel and the compressor wheel such that, even in the case where adequate supercharging cannot be performed due to insufficient rotation speed of the turbine wheel during a low speed state of the internal combustion engine at e.g. a vehicle start, the electric motor can be driven to increase the rotation speed of the compressor wheel, raise the boost pressure of the turbocharger and thereby obtain required power performance from the early stage of the vehicle start.

In Patent Document 1, the electric motor is required to achieve high rotation and high output for the purpose of imparting desired torque to the shaft member. However, the high-rotation, high-output electric motor becomes large in size. The use of such a large-size motor can lead to an increase in the overall size of the turbocharger.

Furthermore, a large amount of heat is generated from a stator coil (as a stator) of the high-rotation, high-output electric motor. Due to such heat generation, a magnet (as a rotor) of the electric motor may be deteriorated by being heated to a high temperature. This can cause a decrease in the driving efficiency of the electric motor by deterioration of magnetic force.

PRIOR ART DOCUMENTS

Patent Documents

Patent Document 1: Japanese Laid-Open Patent Publication No. 2000-130176

SUMMARY OF THE INVENTION

According to the present invention, there is provided a turbocharger, comprising: a turbine wheel driven by exhaust gas from an internal combustion engine; first and second compressor wheels coaxially coupled to the turbine wheel via a shaft member; a main housing accommodating the first and second compressor wheels and having defined therein a communication passage through which air compressed by the first compressor wheel flows to the second compressor wheel; and an electric motor arranged in the communication passage and comprising the shaft member as a rotation shaft thereof.

The electric motor may have a plurality of heat radiating fins formed protrudingly on an outer circumferential surface thereof. The heat radiating fins may be formed to protrude radially from the electric motor. Further, the heat radiating fins may be formed continuously from one end portion of the electric motor facing the first compressor wheel to the other end portion of the electric motor facing the second compressor wheel.

The electric motor may have a cylindrical motor housing formed to introduce the air to the inside of the motor housing from one end portion of the motor housing facing the first compressor wheel and discharge the air to the communication passage from the other end portion of the motor housing facing the second compressor wheel. The other end portion of the motor housing may be in communication with the communication passage such that the air inside the motor housing can be discharged from the other end portion of the motor housing to the communication passage in the axial direction of the shaft member.

In the present invention, the electric motor is arranged in the communication passage through which the air constantly flows from the first compressor wheel side to the second compressor wheel side. It is thus possible to efficiently cool the electric motor and suppress a decrease in the driving efficiency of the electric motor caused due to a temperature rise. Furthermore, the air is compressed in two stages by the first and second compressor wheels so as to generate a desired boost pressure even when the rotation speed of the shaft member is relatively low. It is thus possible to not only suppress heat generation of the electric motor but also achieve downsizing of the electric motor.

DESCRIPTION OF THE EMBODIMENTS

Figure 1:
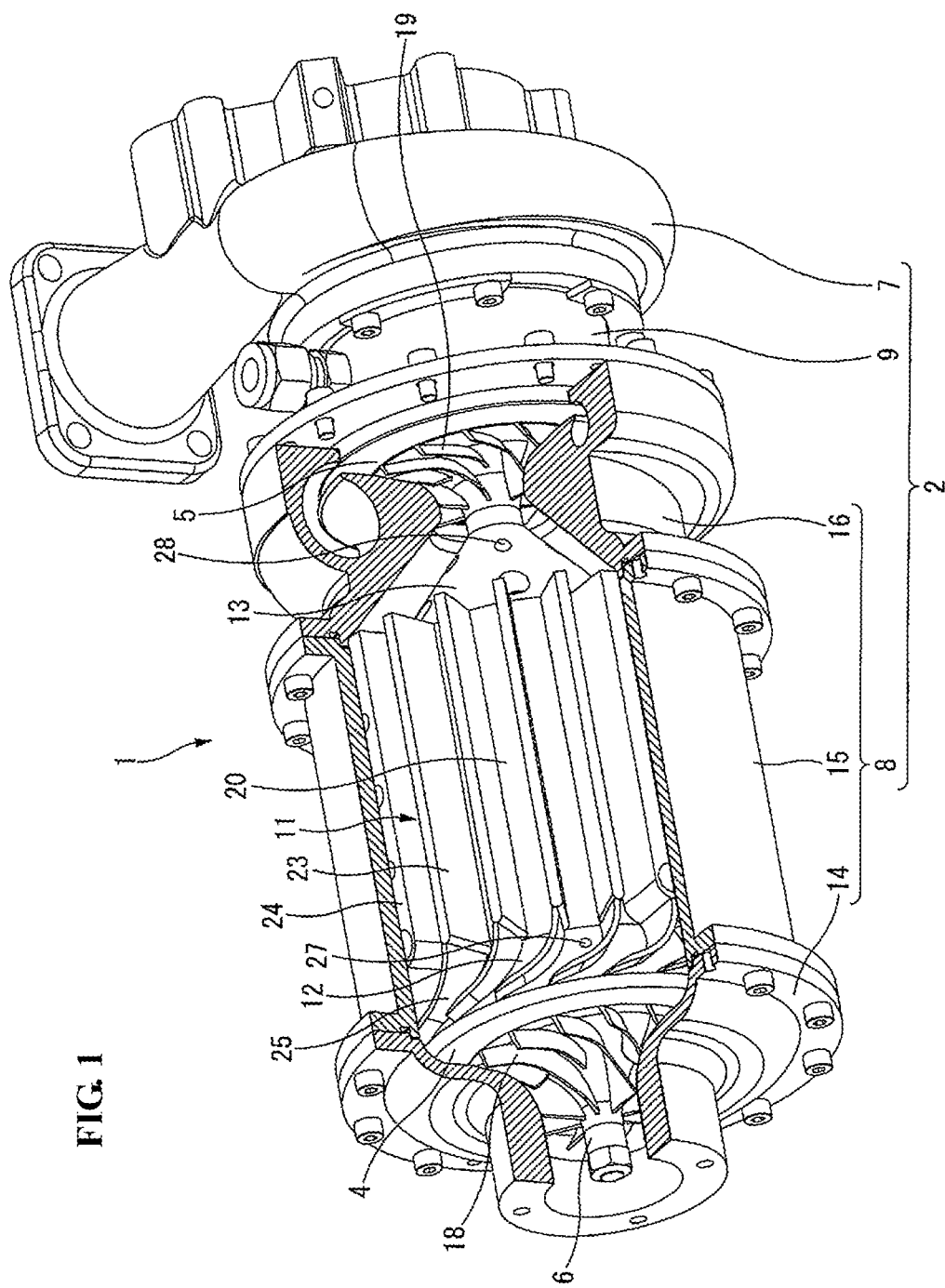
FIG. 1 is a partially cutaway schematic view of a turbocharger according to one embodiment of the present invention.
Figure 2:
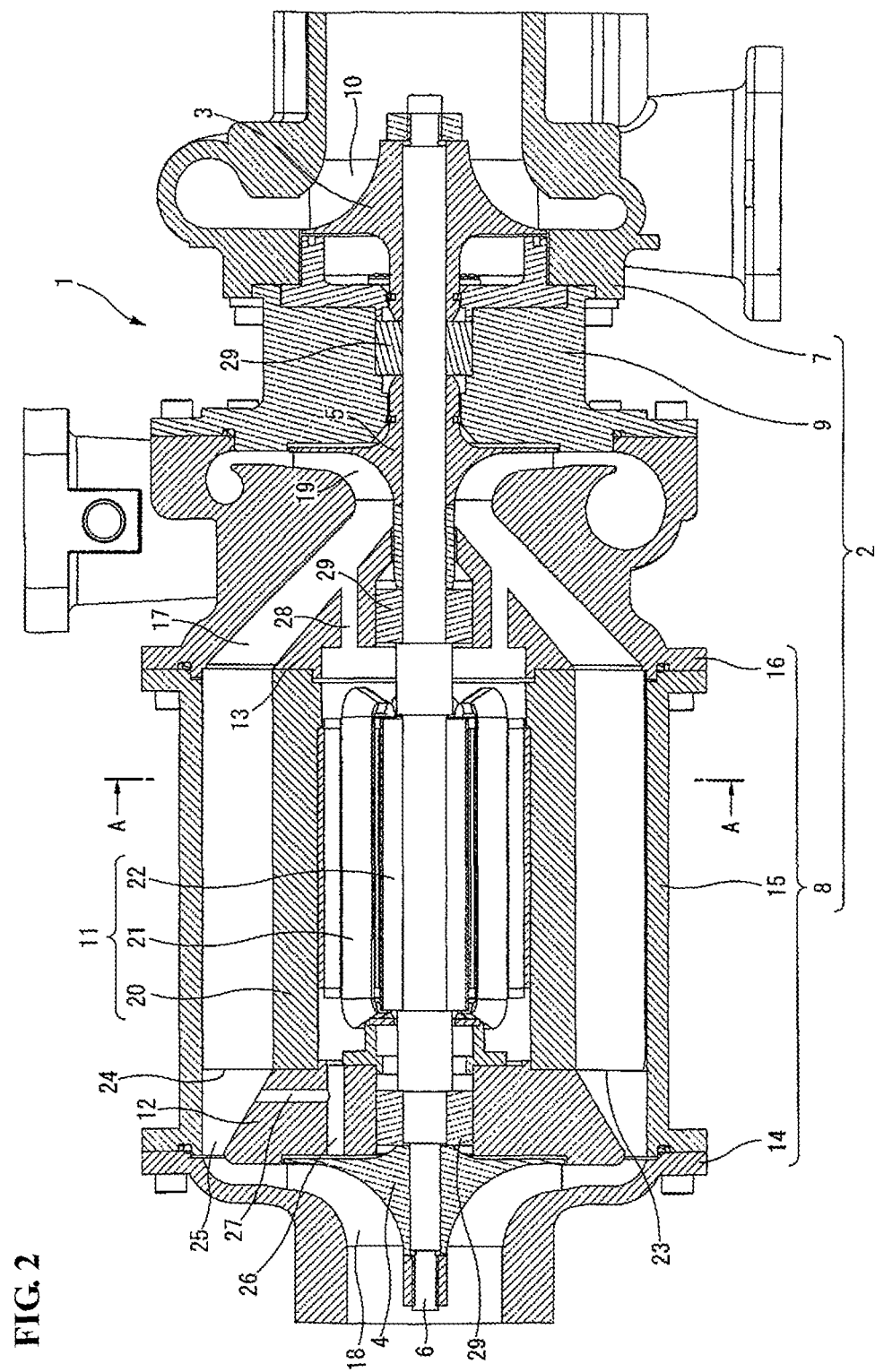
FIG. 2 is a cross-sectional view of the turbocharger according to the one embodiment of the present invention.
Figure 3:
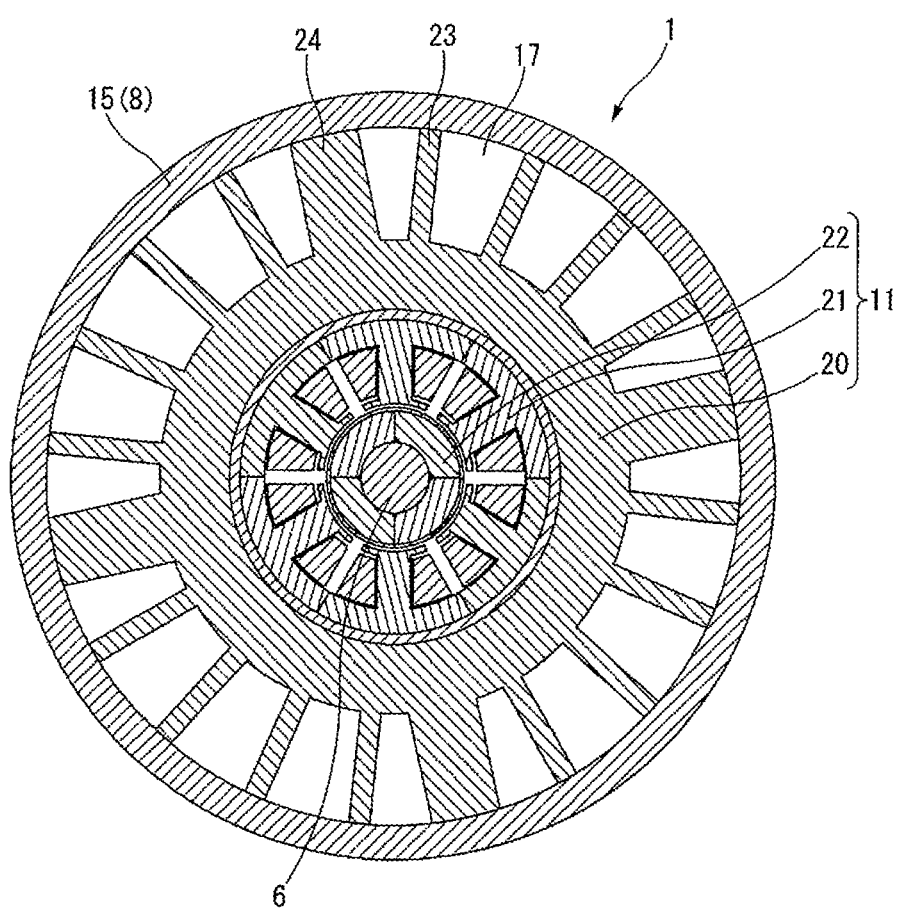
FIG. 3 is another cross-sectional view of the turbocharger according to the one embodiment of the present invention.

Hereinafter, one embodiment of the present invention will be described in detail below with reference to FIGS. 1 to 3. FIG. 1 is a partially cutaway schematic view of a turbocharge 1 according to one embodiment of the present invention. FIG. 2 is a cross-sectional view of the turbocharger 1 according to the one embodiment of the present invention. FIG. 3 is another cross-sectional view of the turbocharger 1 according to the one embodiment of the present invention as taken along line A-A of FIG. 2.

In the turbocharger 1, air to be supplied to an internal combustion engine (not shown) of a vehicle is compressed in two stages within a turbocharger housing assembly 2. More specifically, the turbocharger 1 has a turbine wheel 3, a first compressor wheel 4 and a second compressor wheel 5 each coaxially attached to an elongated cylindrical column-shaped shaft member 6 to perform supercharging by the use of exhaust gas energy.

The turbocharger housing assembly 2 is substantially cylindrical in shape. As shown in FIGS. 1 and 2, the turbocharger housing assembly 2 generally includes a turbine housing 7 located on one end side thereof, a compressor housing 8 located as a main housing on the other end side thereof and an intermediate housing 9 located between the turbine housing 7 and the compressor housing 8, and accommodates therein the shaft member 6.

The shaft member 6 is made of a metal material. The turbine wheel 3 is fixed to one end portion of the shalt member 6; the first compressor wheel 4 is fixed to the other end portion of the shaft member 6; and the second compressor wheel 5 is fixed to an intermediate portion of the shaft member 6.

Each of the turbine housing 7, the compressor housing 8 and the intermediate housing 9 is made by e.g. casting of a metal material.

The turbine housing 7 accommodates the turbine wheel 3. The turbine wheel 3 is made by e.g. casting of a metal material and has a plurality of turbine blades 10 formed thereon.

The intermediate housing 9 mainly supports the shaft member 6 and connects the turbine housing 7 and the compressor housing 8 to each other in an axial direction of the shaft member 6.

The compressor housing 8 accommodates not only the first and second compressor wheels 4 and 5, but also an electric motor 11 which is arranged between the first and second compressor wheels 4 and 5, a first cylindrical member 12 which is interposed between the first compressor wheel 4 and the electric motor 11, and a second cylindrical member 13 which is interposed between the second compressor wheel 5 and the electric motor 11.

In the present embodiment, the compressor housing 8 generally includes a first housing member 14, a second housing member 15 and a third housing member 16 and has defined therein a communication passage 17 through which air compressed by the first compressor wheel 4 flows to the second compressor wheel 5. Herein, the communication passage 17 is a continuous space formed between an outer circumferential surface of the shaft member 6 and an inner circumferential surface of the compressor housing 8 along the axial direction of the shaft member 6 at a location between the first compressor wheel 4 and the second compressor wheel 5.

The first housing member 14 mainly accommodates the first compressor wheel 4. The second housing member 15 mainly accommodates the first cylindrical member 12 and the electrical motor 11 within the communication passage 17. The third housing member 16 mainly accommodates the second compressor wheel 5 and the second cylindrical member 13 and connects the second housing member 15 to the intermediate housing 9 in the axial direction of the shall member 6.

The first compressor wheel 4 is made by e.g. casting of a metal material and has a plurality of first compressor blades 18 formed thereon. The second compressor wheel 5 is also made by e.g. casting of a metal material and has a plurality of second compressor blades 19 formed thereon.

As shown in FIGS. 2 and 3, the electric motor 11 includes a cylindrical motor housing 20, a plurality of stators 21 constituted by stator coils and fixed to an inner circumferential side of the motor housing 20, and a plurality of rotors 22 constituted by permanent magnets and fixed to the shaft member 6. In the present embodiment, the shaft member 6 is utilized as a rotation shaft of the electric motor 11. In the case where adequate supercharging cannot be performed due to insufficient rotation of the turbine wheel 3, the electric motor 11 is driven and rotated by energization of the stators 21 so as to compensate for the insufficiency of the rotation of the turbine wheel 3. Further, the electric motor 11 is adapted to generate electric power according to the circumstances.

The motor housing 20 is made of e.g. a metal material and has, on an outer circumferential surface thereof, a plurality of linear heat radiating fins 23 formed protrudingly along the axial direction of the shaft member 6 and a plurality of linear ribs 24 formed protrudingly with a larger thickness than that of the heat radiating fins 23 along the axial direction of the shaft member 6. When viewed in the axial direction of the shaft member 6, the heat radiating fins 23 and the ribs 24 protrude radially from the motor housing 20. The heat radiating fins 23 and the ribs 24 are circumferentially apart from one another and each continuous from one end portion of the motor housing 20 (one end portion of the electric motor 11) facing the first compressor wheel 4 to the other end portion of the motor housing 20 (the other end portion of the electric motor 11) facing the second compressor wheel 5. Further, each of the heat radiating fins 23 and the ribs 24 is in parallel with the shaft member 6. The ribs 24 of the motor housing 20 are fixed to the second housing member 15 by unillustrated bolts from radial directions of the motor housing 20. The first cylindrical member 12 is fixed to the first-compressor-wheel side end portion of the motor housing 20 by unillustrated bolts. The second cylindrical member 13 is fixed to the second-compressor-wheel side end portion of the motor housing 20 by unillustrated bolts from the axial direction of the shaft member 6.

The first cylindrical member 12 is made by e.g. casting of a metal material and has a plurality of rectification fins 25 formed on an outer circumferential surface thereof. The rectification fins 25 are used to rectify the flow of the air compressed by the first compressor wheel 4 and introduce the compressed air to a space between the motor housing 20 and the second housing member 15. A first-compressor-wheel 4 side end portion of the first cylindrical member 12 is situated apart from a back surface of the first compressor wheel 4. A second-compressor-wheel 5 side end portion of the first cylindrical member 12 is fixed to the first-compressor-wheel 4 side end portion of the motor housing 20 by unillustrated bolts.

A plurality of first air introduction holes 26 are formed through the first cylindrical member 12 in the axial direction of the shaft member 6. Each of the first air introduction holes 26 has one end opening at an inner side with respect to the inner circumferential surface of the motor housing 20 and the other end opening at a position opposing the back surface of the first compressor wheel 4. Moreover, a plurality of second air introduction holes 27 are formed radially through the first cylindrical member 12 such that each of the second air introduction holes 27 has one end opening at the outer circumferential surface of the first cylindrical member 12 and the other end connected to a center region of the first air introduction hole 26.

The second cylindrical member 13 is also made by e.g. casting of a metal material. A plurality of air discharge holes 28 are formed through the second cylindrical member 13 in the axial direction of the shaft member 6. Each of the air discharge holes 28 has one end communicating with the communication passage 17 at a position inside the third housing member 16 and the other end opening at an inner side with respect to the inner circumferential surface of the motor housing 20.

Through these first and second air introduction holes 26 and 27, a part of the compressed air is introduced to the motor housing 20 from between the hack surface side of the first compressor wheel 4 and the rectification fins 25. The compressed air introduced to the inside of the motor housing 20 flows between the stators 21 and between the stators 21 and the rotors 22 in the axial direction of the shaft member 6 toward the second compressor wheel 5, and then, is discharged in the axial direction of the shaft member 6 through the air discharge holes 28 of the second cylindrical member 13 to the communication passage 17 within the third housing member 16. Namely, the other end portion of the motor housing 20 is in communication with the communication passage 17 such that the air inside the motor housing 20 is discharged from the other end portion of the motor housing 20 to the communication passage 17 in the axial direction of the shaft member 6. It is herein noted that reference numeral 29 in FIG. 2 denotes a bearing by which the shaft member 6 is rotatably supported.

In the above-structured turbocharger 1, the air inside the communication passage 17 constantly flows toward the second compressor wheel 5 by the air suction action of the second compressor wheel 5. As the electric motor 11 is arranged in the communication passage 11 between the first compressor wheel 4 and the second compressor wheel 5, the air does not remain and accumulate in the vicinity of the electric motor 11. It is therefore possible to efficiently cool the electric motor 11 and thereby effectively suppress a decrease in the driving efficiency of the electric motor 11 caused due to a temperature rise of the electric motor 11.

During boost pressure assist operation of the electric motor 11, for example, the failure to achieve a desired boost pressure can be avoided by suppressing a decrease in the driving efficiency of the electric motor 11 caused due to a temperature rise of the electric motor 11. The sufficient boost pressure is thus ensured to maintain good driving state of the vehicle. During power generation operation of the electric motor 11, the failure to achieve a desired power generation efficiency can be avoided by suppressing a decrease in the driving efficiency of the electric motor 11 caused due to a temperature rise of the electric motor 11. Thus, electric energy is efficiently regenerated from surplus rotation of the turbine wheel 3 by exhaust gas, so as to contribute to improvement in the fuel efficiency of the vehicle.

In the present embodiment, the heat radiating fins 23 are formed on the outer circumferential surface of the motor housing 20. It is possible by these fins to efficiently radiate heat of the stators 21, which are fixed to the inner circumference of the motor housing 20, to the air inside the communication passage 17 and suppress a temperature rise of the stators 21.

Further, a part of the air compressed by the first compressor wheel 4 is introduced to the inside of the electric motor 11 in the present embodiment. With the introduction of such compressed air to the electric motor 11, it is possible to directly cool the heat-generating stators 21 as well as the rotors 22 raised in temperature by heat generation of the stators 21 so that the electric motor 11 can be efficiently cooled from the inside and outside.

Furthermore, the air is compressed in two stages by the first and second compressor wheels 4 and 5 so that the desired boost pressure can be obtained even when the rotation speed of the shaft member 6 is relatively low. This makes it possible to suppress heat generation of the electric motor 11 and, at the same time, achieve downsizing of the electric motor 11.

Since the air is compressed in two stages by the first and second compressor wheels 4 and 5, the desired boost pressure can be generated without setting the charging rate of the first compressor wheel 4 to a high degree. This makes it possible to lower the temperature rise of the air compressed by the first compressor wheel 4 and efficiently cool the electric motor 11.

As the turbocharger 1 is configured to not only perform two-stage air compression but also allow the electric motor 11 to compensate for insufficient rotation of the turbine wheel 3, it is possible to construct a compact turbocharger system capable of achieving good supercharging efficiency from a low rotation state even with the use of the relatively small-sized electric motor 11. Moreover, torque and centrifugal force is set relatively small by relatively low rotation operation of the turbocharger 1. It is thus possible that the bearing 29, on which the shaft member 6 is rotatably supported, and the electric motor 11 can each ensure sufficient strength even with a relatively simple low-cost structure.

The invention claimed is:

1. A turbocharger, comprising:
   a turbine wheel driven by exhaust gas from an internal combustion engine;
   a first compressor wheel and a second compressor wheel coaxially coupled to the turbine wheel via a shaft member;
   a main housing accommodating the first and second compressor wheels and having defined therein a communication passage through which air compressed by the first compressor wheel flows to the second compressor wheel; and
   an electric motor arranged in the communication passage,
   wherein the electric motor comprises
      the shaft member as a rotation shaft thereof: and
      a cylindrical motor housing provided in the main housing, the cylindrical motor housing having a first end portion facing the first compressor wheel, and a second end portion located opposite from the first end portion in an axial direction of the shaft member and facing the second compressor wheel, and
      wherein the first and second end portions of the cylindrical motor housing are in fluid communication with the communication passage via a first air introduction channel and a second air introduction channel such that compressed air is introduced from the communication passage to the inside of the cylindrical motor housing through the first end portion of the cylindrical motor housing, flows through an inside of the cylindrical motor housing in the axial direction of the shaft member and is discharged to the communication passage through the second end portion of the cylindrical motor housing;
   wherein a first cylindrical member is provided and fixed between the first compressor wheel and the cylindrical motor housing, the first cylindrical member including the first air introduction channel which is perpendicular with respect to a longitudinal axis of the shaft member and the second air introduction channel which is parallel with respect to the longitudinal axis of the shaft member; and
   wherein the first air introduction channel intersects the second air introduction channel prior to compressed air flowing into the first end portion of the cylindrical motor housing.

2. The turbocharger according to claim 1, wherein the electric motor has a plurality of heat radiating fins formed protrudingly on an outer circumferential surface of the cylindrical motor housing.

3. The turbocharger according to claim 2, wherein, when viewed in the axial direction of the shaft member, the heat radiating fins protrude radially from the electric motor.

4. The turbocharger according to claim 2, wherein the heat radiating fins are formed continuously from the first end portion to the second end portion of the cylindrical motor housing.

5. The turbocharger according to claim 1, wherein the electric motor comprises a rotor and a stator provided in the cylindrical motor housing such that the compressed air introduced from the first end portion of the cylindrical motor housing flows between the rotor and the stator to the second end portion of the cylindrical motor housing.

6. The turbocharger according to claim 1, wherein the main housing further comprises:
- a second cylindrical member fixed to the second end portion of the cylindrical motor housing and having formed therein an air discharge hole to provide air communication from the second end portion of the cylindrical motor housing to the communication passage.

* * * * *